April 10, 1934.

F. D. PFENING ET AL 1,954,024

LIQUID MEASURING MEANS

Filed April 6, 1932

Inventors
F. D. Pfening
Henry Pfening Jr.

By W. S. McDowell

Attorney

April 10, 1934.　　F. D. PFENING ET AL　　1,954,024
LIQUID MEASURING MEANS
Filed April 6, 1932　　2 Sheets-Sheet 2

Inventors
F. D. Pfening
Henry Pfening Jr.
By W. S. McDowell
Attorney

Patented Apr. 10, 1934

1,954,024

UNITED STATES PATENT OFFICE 1,954,024

LIQUID MEASURING MEANS

Frederic D. Pfening and Henry Pfening, Jr., Columbus, Ohio, assignors to The Fred D. Pfening Company, Columbus, Ohio, a corporation of Ohio Application April 6, 1932, Serial No. 603,592

5 Claims. (Cl. 221—101)

This invention relates to liquid measuring and dispensing apparatus of the character disclosed in our Patent No. 1,775,293 granted September 9, 1930, wherein provision is made for passing temperature regulated liquids through a confined flow line in which is positioned a recording meter and wherein the flow of the liquid through said line is under the control of an electrically operated valve, there being an electrical circuit associated with said meter whereby after a predetermined amount of liquid has passed through the flow line, an electrical valve is closed automatically to arrest further liquid flow so that measured quantities of the liquid may be obtained.

The present invention has for its primary object to provide certain hereinafter described improvements upon the construction and arrangement of the apparatus disclosed in our aforesaid patent to the end of obtaining an improved and more satisfactory operation and to provide additional features of control and regulation by which the operation of the apparatus is both simplified and improved. For a further understanding of the invention, reference is to be had to the following description and the accompanying drawings, in which:

Fig. 1 is a view in front elevation of the cabinet in which the control mechanism comprising the invention is contained;

Fig. 2 is a side elevation thereof;

Fig. 3 is a front elevation of the cabinet disclosing the door thereof in an open position and illustrating more particularly the interior mechanism as mounted within the cabinet;

Figure 4:
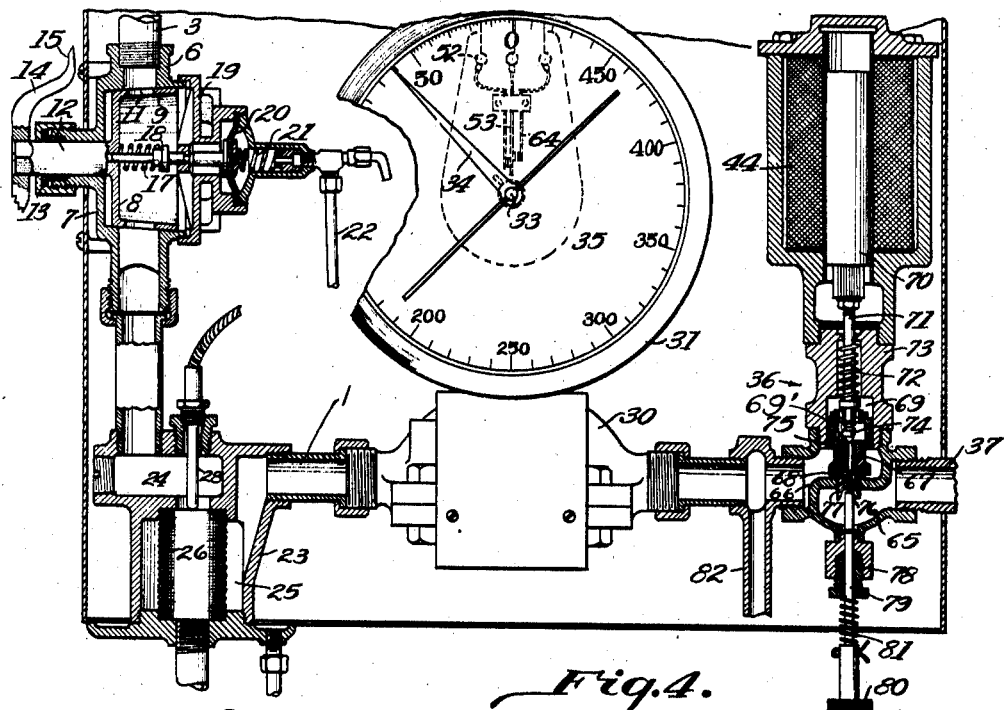
Fig. 4 is a view principally in vertical section taken through the cabinet and disclosing more particularly the temperature controlling mixing valve, the recording meter and the electrically operated solenoid valve.

Referring to the drawings, the character A designates a cabinet which may be mounted on a wall or other suitable support and in which is contained the several relating units employed in our system of automatic liquid measurement. Disposed in the cabinet is a liquid flow line which is designated by the numeral 1 and comprises a plurality of related pipe sections through which a liquid is passed under regulated conditions of measurement. Any desired liquid may be utilized, although our invention is particularly applicable to the baking industry, wherein it is necessary to use repeatedly measured quantities of water at certain desired temperatures.

Water enters the flow line through a plurality of pipes indicated at 2, 3 and 4 under, for example, city main pressure, although other means may be provided, such as a pump, for advancing a liquid under requisite pressures through the liquid conducting lines. In this particular embodiment of the invention, chilled or refrigerated water passes through the pipe 2, water flowing through the pipe 3 is preferably at a normal or water main temperature, while the water passing through the pipe 4 is heated to a desired elevated temperature. The pipes 2, 3 and 4 are each equipped with a check valve 5 which limits the flow of the liquid through the pipes to but a single direction.

The lower ends of the pipes 2, 3 and 4 enter branch nipples 6 integrally formed with a circular casing 7 in which is positioned a rotatable and substantially circular valve member 8. This member is provided with an annular rim or collar 9 which closely engages and conforms with the curvature of the valve chamber 10 formed in said casing. The collar 9 is provided contiguous to its upper portion with a slot 11 which is of such length that it may bridge or register with at least two of the ports 6 but may be also positioned to register with but one of said ports. By this arrangement, water may pass through the valve member at the temperatures prevailing in any one of the pipes 2, 3 and 4 or by registering with a plurality of the outlets of such pipes a desired average temperature of the liquid passing from the temperature or mixing valve may be obtained.

Figure 5:
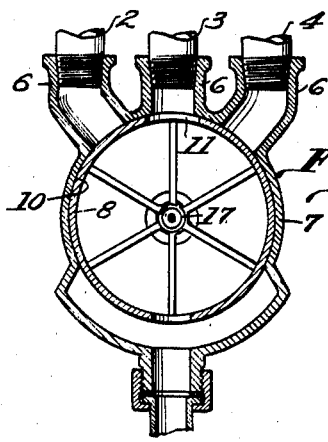
Fig. 5 is a view in vertical section taken through the mixing valve.
Figure 7:
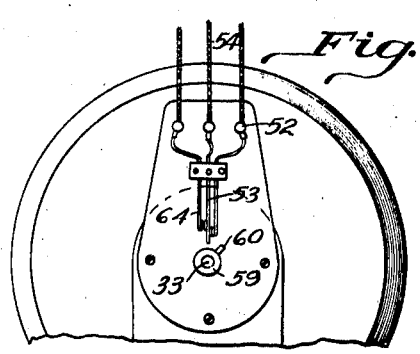
Fig. 7 is a view in rear elevation of the circuit controlling switch mounted in conjunction with the rear of the recording meter.

The construction of this mixing valve has been specifically set forth and claimed in our co-pending application Serial No. 603,591 filed April 6, 1932, and therefore does not, per se, form a part of the claimed features of the present invention but for clarity in description, it will be observed, by reference to Figs. 4 and 5, that the valve member 8 includes an axial stud shaft 12 journaled for rotation in a packed bearing 13 formed on one side of the casing 7. The outer end of this shaft is preferably squared for the reception of an operating handle 14, provided with an indicating pointer 15 movable over a graduated surface 16 provided on one of the side walls of the cabinet A. By noting the positions of the pointer 15 with relation to the surface 16, the attendant is informed generally as to the temperature of the water passing through the mixing valve when the valve is open. The positions of the rotatable valve 8 are maintained by the provision of a spring 17 arranged axially in the mixing valve. This spring surrounds a pin 18 which is carried by the threaded forward wall 19 of the casing. The spring 17 presses at one end on a fixed collar formed with the pin 18 and at its other end engages with one of the surfaces of the valve member 8. The pressure exerted by the spring on the valve member produces sufficient friction to retain said member in its adjusted positions.

The front wall 19 is formed to receive a diaphragm 20 positioned to be subjected to the pressure of the water which passes through the mixing valve and this diaphragm is pressed by means of a coil spring 21 towards the member 8. The purpose of the diaphragm is to absorb high pressure surges of the liquid in the pipe line and valve structure and to relieve the system of what is commonly known as "water hammer" when valves are suddenly opened or closed. A valve breather pipe 22 is connected with the valve casing of the diaphragm. Manifestly by means of this valve mechanism a desired temperature of the liquid entering the flow line is obtainable and this temperature possesses a range between the extremes of temperature of the liquids entering the system through the lines 2, 3 and 4.

Disposed in the flow line 1 and mounted within the cabinet is a casing 23, which includes inlet and outlet chambers 24 and 25 respectively. These chambers are separated by a strainer 26 adapted to remove undesired solid matter or sediment from the liquid as the latter passes through the flow line. The bottom of the casing 23 is formed with a drain valve 27. Also carried by the casing 23 is a temperature responsive element 28 which is connected with a visible temperature indicator 29 carried by the hinged front door of the cabinet. The temperature indicator is viewable from the front of the cabinet and may be employed to assist the attendant in obtaining desired temperatures on the part of the liquid metered by the system.

The liquid discharged from the outlet chamber of the casing 23 continues on through the flow line and passes through the rotary chamber 30 of a liquid flow meter 31. As usual, the meter 31 has positioned in the casing 30 an actuator (not shown) which is adapted to be revolved by the passage of liquid through the casing 30. The operation of the actuator effects the rotation of an indicator shaft 33, which has mounted on its outer end a hand 34 movable over a graduated stationary dial 35. This dial has suitably provided thereon graduations which indicate pounds, although other arbitrary units of measurement may be utilized depending upon the specific uses of the apparatus.

After passing through the flow meter 31, the liquid continues its flow through the line 1 and passes to a solenoid or magnetic valve 36. This valve is arranged in an electrical circuit, under the control of the operation of the meter 31, and its operation is such that after a predetermined quantity of liquid has passed through the meter, the coil of the valve 36 will be deenergized to effect the closing of the valve 36 under spring starting and water pressure and arrest thereby further flow of liquid through the discharge portion 37 of the line 1, and it is an outstanding feature of the present invention to provide improved circuit controlling means between the meter and the solenoid valve for regulating the liquid flow through and from the line 1.

Figure 6:
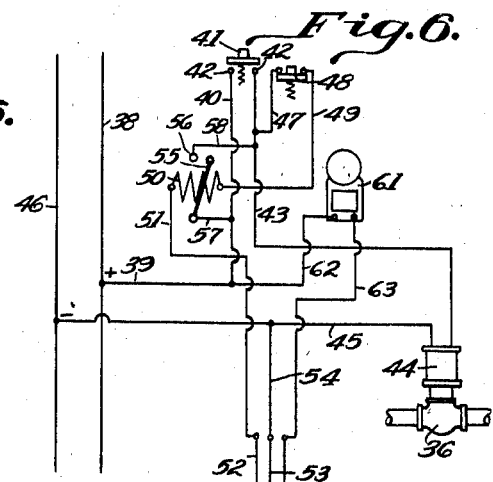
Fig. 6 is a diagrammatic view of the electrical circuits utilized in connection with the recording meter for controlling the operation of the solenoid valve.

Referring now more particularly to Fig. 6, electrical current is supplied by the trunk line 38 and passes by way of a conductor 39 to a line 40 in which is located a push button switch 41. To start the apparatus, this push button switch is depressed against spring pressure to bridge the terminals 42 which allows current to flow by way of the line 43 to the windings 44 of the solenoid field, and from the solenoid, the current passes by way of the conductor 45 to the return trunk line 46. Thus by pressing the button 41, the solenoid is energized to open the valve 36 and to permit of liquid passage through the flow line. In order to keep the valve 36 in an open position without requiring the attendant to continue to press the button 41, a shunt circuit is provided which includes a conductor 47 connected with the line 43 and which leads to an energizing stop switch 48 of the push button variety. Normally, the push button switch 48 occupies a circuit closing position so that current passes from the conductor 47, through 48 and thence through a line 49 which leads to the field windings 50 of a magnetic switch. From the windings 50, a conductor 51 extends to the terminal 52 of a meter switch located on or contiguous to the back of the meter 31. Normally in engagement with the terminal 52 is a resilient arm 53 and a conductor 54 leads from the arm 53 to the return lead 45. Thus at the instant when the push button switch 41 is depressed into a circuit closing position, current not only travels to a solenoid valve but likewise passes through the relay switch 50, energizing its field to attract a movable arm 55 into position engaging with a stationary terminal 56. The arm 55 is normally held out of contact with the terminal 56 by a spring or its equivalent but when the field 50 is energized, this influence is overcome and the free end of the arm 55 is brought into contact with the terminal 56. This permits the relay field 50 to remain energized after finger pressure has been removed from the button switch 41, since current flows through the lines 39 and 40, thence through the branch 57, through the arm 55 and by way of the branch 58 to the conductor 47, thence through the switch 48 and the conductor 49 to the relay field 50. From the field 50, the current passes by way of the line 51, the terminal 52, the movable arm 53 and the lead 54 to the return lines 45 and 46. In this manner, the relay switch remains excited even after the push button 41 is released in order to attract the armature 55 and keep the latter in contact with the stationary terminal 56. Likewise the solenoid valve remains energized independently of the manually operated switch 41. This is attained by passing the current through the lines 39 and 40, thence through the armature 55 and the line 58 to the line 43, which leads to the field winding 44, the circuit returning by way of the line 45 to return trunk 46. If at any time the attendant desires to stop the operation of the apparatus and close the solenoid valve, the push button switch 48 is operated which deenergizes the fields 44 and 50 of the solenoid valve and relay switch respectively. Otherwise the apparatus continues to operate in accordance with the control and adjustment secured by the pointer 34. As stated, the pointer or indicator is operated by the shaft 33 from the rotor of the meter. The rear end of the shaft 33 has fixed thereon or rotatable therewith a collar 59 which carries a fixed lug or finger 60 disposed in its path of movement, upon the rotation of the shaft 33, to contact with the lower end of the movable arm 53 of the meter controlled switch so that said arm is moved out of contact with its normally contact terminal 52. Thus when the indicator 34 reaches its zero position on the graduated dial 35, the lug 60 engages with the arm 53 to break its contact with the terminal 52, thereby deenergizing the fields 44 and 50, causing the closing of the valve 36 and the automatic arrest of liquid flow through the pipe line 1.

If for any reason this operation should fail and the valve 36 should remain open, we have provided a signal in the form of an audible alarm as indicated at 61. One terminal of this alarm is connected with a lead 62 extending from the line 39, while the other terminal of the alarm is connected with a wire 63 which extends to a resilient contact member 64 disposed adjacent the member 53. Thus when the apparatus is in operation, the hand or pointer 34 of the flow meter is turned anti-clockwise to set the apparatus to deliver a required number of pounds, or other units of measure, of liquid. The press button 41 is actuated which opens the valve 36 and sets the apparatus into active operation. The pointer 34 then moves clockwise until it reaches its zero position, wherein the interrupter comprising the parts 52, 53, 59 and 60 functions to break the circuit and close the valve 36. If the valve does not close, due to any possible failure, the lug 60 forces the switch member 53 into contact with the terminal 64, thereby energizing the alarm circuit and directing the attendant's attention to the condition of disorder. The push button 48 may then be operated as an emergency measure or the various valves manipulated to positions of closure, for instance, by moving the lever 14 to a valve closing position.

The valve 36 comprises, as shown in Fig. 4, a body 65 divided by a central wall 66 into inlet and outlet compartments, the wall 66 being formed with a port constituting a valve seat. Arranged to engage with this seat is a valve member 67 socketed at its lower end for the reception of a gasket 68 which normally engages with the valve seat. The upper portion of the valve member is slidably received within a socket 69 and is provided with ports 69' to admit and govern the flow of fluid through the valve to the walled armature chamber of the solenoid 44. This construction avoids the use of packing and permits of water flow around the armature 70 for cooling purposes.

The armature 70 carries a depending stem 71, and fixed on this stem is a collar which engages with the lower end of a coil spring 72, the latter being confined in a vertical passage provided in a casing 73. The lower end of the stem 71 is provided with a pointed head 74 which is receivable within a guide opening 75 provided in the valve member 67. The head 74 is permitted to move to a limited extent freely in connection with the upper portion of the valve member so that when the solenoid is initially energized, the armature may respond to the excitation of the field winding of the solenoid without being encumbered by the action of fluid pressure. After its initial movement, the armature picks up the valve member and raises it to an elevated or open position. The extreme lower end of the valve member is threaded as at 76 for the reception of a guide nut 77, which not only guides the valve member in relation to the valve seat but operates to retain the gasket against accidental displacement. The bottom of the valve casing is formed with a packed gland 78 in which is slidably positioned a stem 79, the latter projects through the bottom of the cabinet A and is provided with an operating handle 80, there being a spring 81 positioned between the handle and the nut of the gland 78, said spring normally serving to hold the upper end of the stem 79 free from contact with the bottom of the valve member. To open the valve manually however, the stem 79 is forced upwardly, causing it to contact with the valve member and thereby raise the latter to an open position. Between the meter 31 and the valve 36, a draw-off line 82 is provided which projects through the bottom of the cabinet and is equipped with a control valve 83. The line 82 is used to remove liquid and to conduct the same to a different vessel or compartment than that into which the liquid passing through the valve 36 is delivered. Any liquid however removed from the line 82 is measured by the operation of the flow meter. The line 82 is often used as a means for obtaining liquid in the making of yeast mixtures. This solenoid valve is extremely positive in its opening and closing action. Its construction provides for tight seating, quick acting and the opening thereof only when energized.

This application is a continuation in part of the disclosures contained in our Patent No. 1,876,512 issued September 6, 1932.

What is claimed is:

1. In apparatus for regulating and measuring the flow of liquid through a conduit, a flow meter arranged in said conduit and provided with a shaft rotatable in response to liquid passage through the meter, a normally closed electrically operated valve cooperative with the outlet of said meter, an electric circuit for said valve including a manually operated normally open starting switch, a magnetic switch in said circuit energized automatically upon the closing of the starting switch to maintain said circuit closed independently of the starting switch, a normally closed interrupter switch in said circuit, an arm fixed upon said shaft for rotation in unison therewith and movable following predetermined passage of liquid through said meter into engagement with said interrupter switch to open said circuit, and an alarm circuit including an alarm device and a normally open switch, said alarm switch being closed by the movement of said arm in the event of an undesired continued flow of liquid through the meter.

2. In liquid measuring apparatus, a flow meter including a casing provided with a graduated dial face having a rotatable shaft provided at one end with a pointer movable around the dial surface in response to liquid flow through the meter, a crank projection mounted to rotate with said shaft and arranged adjacent to the back of the meter in spaced relation from said pointer, a normally closed electrically operated valve, an electric circuit in which said valve is situated, a support carried by the back of said meter, and a normally closed interrupter switch mounted on said support and disposed in said valve circuit, said switch being mounted in the path of movement of said crank projection, whereby the latter, following predetermined passage of liquid through the meter will contact with said interrupter switch to open the valve circuit to close said valve.

3. In liquid measuring apparatus, a flow meter provided with a casing and a shaft rotatable in direct response to the flow of liquid through the meter, one end of said shaft being provided with a pointer movable over a graduated surface provided on the front of the casing, a trip device rotatable with said shaft and arranged adjacent to the back of the meter casing in spaced relation from said pointer, a normally closed electrically operated valve, a circuit for said valve operable when closed to open the valve to permit of liquid flow from the flow meter and through the valve, an interrupter switch arranged in said circuit and having an actuating portion disposed in the path of movement of said trip device whereby following predetermined passage of liquid through the valve, said interrupter switch will be actuated by the trip device to open said circuit and close said valve, and signal means operated by said trip device to actuate an alarm in the event the engagement of the trip device with the interrupter switch fails to result in arresting liquid flow through the meter.

4. In liquid measuring and dispensing apparatus, a liquid flow line, a solenoid valve positioned in said flow line for regulating liquid passage therethrough, a registering meter arranged in said flow line, an interrupter switch carried in connection with said meter and comprising a stationary and a movable contact normally engaging one another, a starting circuit passing through said contacts, a magnetic primary field in said starting circuit, a manually operated switch in said starting circuit operable when closed to initially excite said field, a main circuit passing through the coil of said solenoid, a relay switch in said main circuit responsive to the excitation of said field to close said main circuit whereby to energize the coil of said solenoid valve to admit of liquid passage through said line, rotatable means actuated by said meter following predetermined passage of liquid through said line to move said movable contact away from the stationary one to open said main circuit and effect the closure of the solenoid valve, and an alarm circuit including a stationary contact normally spaced from the movable contact of said interrupter switch, whereby upon undesired continued flow of liquid through said meter, the alarm circuit will be closed upon the engagement of the movable contact with the stationary contact of said alarm circuit.

5. In apparatus for regulating and measuring the flow of liquid through a conduit, a flow meter arranged in said conduit and provided with a shaft rotatable in response to liquid passage through the meter, a manually closed electrically operated valve cooperative with the outlet of said meter, an electric circuit for said valve including a manually operated normally opened starting switch, a magnetic switch in said circuit energized automatically by the closing of the starting switch to maintain said circuit closed independently of the starting switch, an interrupter switch in said circuit comprising a stationary and a movable contact normally in engagement with one another, an arm fixed upon said shaft for rotation in unison therewith and movable following predetermined passage of liquid through said meter into engagement with said movable contact of said interrupter switch to open its associated circuit, and an alarm circuit including an alarm device and a stationary contact normally spaced from said movable contact, said alarm circuit being closed by the movement of said arm and movable contact into engagement with the stationary contact of the alarm circuit in the event of an undesired continued flow of liquid through the meter.

FREDERIC D. PFENING.
HENRY PFENING, Jr.